(12) United States Patent
Shin et al.

(10) Patent No.: US 10,770,989 B2
(45) Date of Patent: Sep. 8, 2020

(54) ELECTRODE STRUCTURE, TRIBOELECTRIC GENERATOR INCLUDING THE SAME, AND METHOD OF MANUFACTURING THE ELECTRODE STRUCTURE

(71) Applicants: Samsung Electronics Co., Ltd., Suwon-si, Gyeonggi-do (KR); Research & Business Foundation Sungkyunkwan University, Suwon-si, Gyeonggi-do (KR)

(72) Inventors: Hyeonjin Shin, Suwon-si (KR); Jeongho Cho, Seoul (KR); Hyungseok Kang, Suwon-si (KR); Han Kim, Seoul (KR); Sangwoo Kim, Yongin-si (KR); Seongsu Kim, Seoul (KR); Siuk Cheon, Suwon-si (KR)

(73) Assignees: Samsung Electronics Co., Ltd., Gyeonggi-do (KR); Research & Business Foundation Sungkyunkwan University, Gyeonggi-do (KR)

( * ) Notice: Subject to any disclaimer, the term of this patent is extended or adjusted under 35 U.S.C. 154(b) by 620 days.

(21) Appl. No.: 15/584,125

(22) Filed: May 2, 2017

(65) Prior Publication Data
US 2018/0041139 A1 Feb. 8, 2018

(30) Foreign Application Priority Data
Aug. 5, 2016 (KR) .......................... 10-2016-0100120

(51) Int. Cl.
H02N 1/04 (2006.01)

(52) U.S. Cl.
CPC ....................................... *H02N 1/04* (2013.01)

(58) Field of Classification Search
CPC ........................................................ H02N 1/04
USPC .......................................................... 361/230
See application file for complete search history.

(56) References Cited

U.S. PATENT DOCUMENTS

| | | | |
|---|---|---|---|
| 9,178,446 B2 | 11/2015 | Wang et al. | |
| 2011/0204317 A1* | 8/2011 | Park | B82Y 30/00 257/9 |
| 2011/0281070 A1* | 11/2011 | Mittal | H01L 31/1884 428/142 |
| 2013/0049531 A1 | 2/2013 | Wang et al. | |
| 2014/0338458 A1* | 11/2014 | Wang | G01L 1/005 73/658 |

FOREIGN PATENT DOCUMENTS

| | | |
|---|---|---|
| CN | 103780134 A | 5/2014 |
| KR | 10-1476742 B1 | 12/2014 |
| KR | 10-1498595 B1 | 3/2015 |

* cited by examiner

*Primary Examiner* — Kevin J Comber
(74) *Attorney, Agent, or Firm* — Harness, Dickey & Pierce, P.L.C.

(57) ABSTRACT

Example embodiments relate to an electrode structure, a triboelectric generator including the electrode structure, and a method of manufacturing the electrode structure. The electrode structure includes a flexible layer configured to be bendable by an external force and an electrode, at least some regions thereof being embedded in the flexible layer.

11 Claims, 13 Drawing Sheets

ELECTRODE STRUCTURE, TRIBOELECTRIC GENERATOR INCLUDING THE SAME, AND METHOD OF MANUFACTURING THE ELECTRODE STRUCTURE

CROSS-REFERENCE TO RELATED APPLICATION

This application claims the benefit of priority from Korean Patent Application No. 10-2016-0100120, filed on Aug. 5, 2016, in the Korean Intellectual Property Office, the disclosure of which is incorporated herein in its entirety by reference.

BACKGROUND

1. Field

Example embodiments relate to electrode structures, triboelectric generators including the same, and/or methods of manufacturing flexible electrode structures.

2. Description of the Related Art

Recently, energy harvesting techniques have been drawing attention. Energy harvesting devices may be referred to as eco-friendly generators that transform mechanical energy generated from wind or vibrations of surrounding environments or human motion to electrical energy.

A triboelectric generator is an energy harvesting device that generates electrical energy based on charge movement that occurs when two charged bodies are rubbed against each other. A triboelectric generator has high energy transformation efficiency, and thus, high output may be obtained even from small external forces. Also, a triboelectric generator has no time constraints or spatial limitations when compared to energy harvesting devices that generate electrical energy from heat or sunlight, and further, may continuously generate electrical energy when compared to energy harvesting devices that generate electrical energy from bending or movement of a piezoelectric material.

Attempts have been conducted to use a triboelectric generator as a power supply device of a wearable device.

SUMMARY

Example embodiments relate to electrode structures having flexibility and mechanical robustness.

Example embodiments relate to triboelectric generators including the electrode structures having flexibility and mechanical robustness.

Example embodiments relate to methods of manufacturing the electrode structures.

Additional example embodiments will be set forth in part in the description which follows and, in part, will be apparent from the description, or may be learned by practice of the example embodiments.

According to an example embodiment, an electrode structure includes a flexible layer bendable by an external force and an electrode including conductive structures, wherein at least some regions of the electrode are embedded in the flexible layer, and the electrode includes a network in which neighboring conductive structures from among the conductive structures are connected to one another.

At least one of the conductive structures may have the shape of at least one of a wire, a rod, or a fiber in which a length thereof is greater than a width.

At least one of the conductive structures may include at least one of a metal or graphene.

According to an example embodiment, a triboelectric generator includes first and second charging layers configured to contact or separate from each other and are charged with opposite polarities to each other due to the contact with each other, a first electrode on the first charging layer, and a second electrode spaced apart from the first electrode and at least some regions thereof being embedded in the second charging layer.

The at least some regions of the second electrode may be embedded from a surface of the second charging layer to an inner portion thereof.

The remaining regions of the second electrode may be exposed to the outside from the surface of the second charging layer.

An areal factor such as a ratio of a surface area of the second electrode with respect to the surface of the second charging layer is in a range from about 10% to about 80%.

Electrical energy generated from the triboelectric generator may depend on the areal factor.

A surface of the second charging layer in which the second electrode is embedded may have a root-mean-square roughness (RMS) of about 2 nm or less.

The second electrode may be embedded in a surface of the second charging layer that contacts the first charging layer.

The second electrode may be embedded in a surface of the second charging layer facing the surface of the second charging layer that contacts the first charging layer.

The second electrode may include a network in which neighboring conductive structures of the conductive structures are connected to one another.

At least one of the conductive structures may have at least a shape of a wire, a rod, or a fiber in which a length thereof is greater than a width.

At least one of the conductive structures may include at least one of a metal or graphene.

One of the first and second charging layers may be charged with negative charges, and the other one may be charged with positive charges.

The triboelectric generator may further include a supporting member configured to support the first and second charging layers so that the first and second charging layers are spaced apart when a force is not applied to the first and second charging layers.

The supporting member may include an elastic material.

According to an example embodiment, a method of manufacturing an electrode structure includes coating a mother substrate with a solution that include one or more conductive structures, laminating a flexible material on a surface of the substrate on which the solution is coated, embedding the conductive structures in the flexible material by applying a pressure, and hardening the flexible material by using at least one of heat or light.

At least some regions of the conductive structures may be embedded in the elastic layer, and remaining regions of the conductive structures may be exposed to the outside of the elastic layer.

The coating of the solution may include coating the solution by using a Meyer rod.

BRIEF DESCRIPTION OF THE DRAWINGS

These and/or other example embodiments will become apparent and more readily appreciated from the following description taken in conjunction with the accompanying drawings in which.

DETAILED DESCRIPTION

Figure 1A:
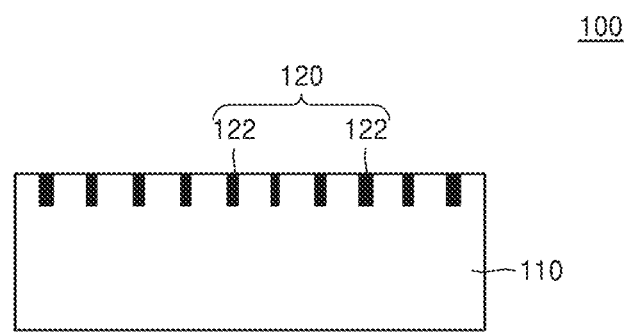
FIG. 1A is a cross-sectional view of an electrode structure according to an example embodiment.

Reference will now be made in detail to example embodiments illustrated in the accompanying drawings. The example embodiments of the inventive concepts are only to materialize the inventive concepts and should not restrict the scope of right or limit the inventive concepts. Accordingly, example embodiments that are readily inferred from the detailed descriptions and embodiments of the inventive concepts by those of ordinary skill in the art will be construed as being included in the inventive concepts.

It will be understood that when an element is referred to as being "on," "connected" or "coupled" to another element, it can be directly on, connected or coupled to the other element or intervening elements that may be present. In contrast, when an element is referred to as being "directly on," "directly connected" or "directly coupled" to another element, there are no intervening elements present. As used herein the term "and/or" includes any and all combinations of one or more of the associated listed items. Further, it will be understood that when a layer is referred to as being "under" another layer, it can be directly under or one or more intervening layers may also be present. In addition, it will also be understood that when a layer is referred to as being "between" two layers, it can be the only layer between the two layers, or one or more intervening layers may also be present.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

When the terms "about" or "substantially" are used in this specification in connection with a numerical value, it is intended that the associated numerical value include a tolerance of ±10% around the stated numerical value. Moreover, when reference is made to percentages in this specification, it is intended that those percentages are based on weight, i.e., weight percentages. The expression "up to" includes amounts of zero to the expressed upper limit and all values therebetween. When ranges are specified, the range includes all values therebetween such as increments of 0.1%. Moreover, when the words "generally" and "substantially" are used in connection with geometric shapes, it is intended that precision of the geometric shape is not required but that latitude for the shape is within the scope of the disclosure. Although the tubular elements of the embodiments may be cylindrical, other tubular cross-sectional forms are contemplated, such as square, rectangular, oval, triangular and others.

Figure 1B:
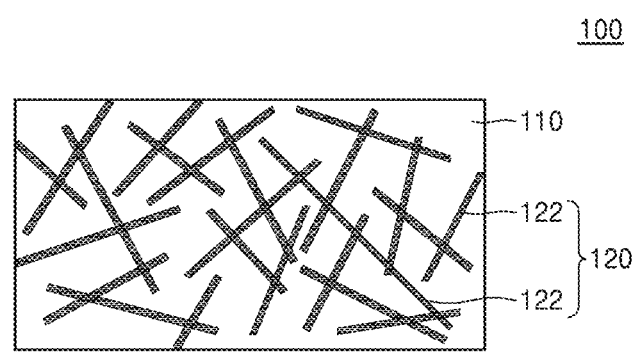
FIG. 1B is a plan view of the electrode structure of FIG. 1A.

FIG. 1A is a cross-sectional view of an electrode structure 100 to be applied to an electronic device, according to an example embodiment. FIG. 1B is a plan view of the electrode structure 100 of FIG. 1A.

The electrode structure 100 may be flexible and stretchable. Referring to FIGS. 1A and 1B, the electrode structure 100 may include a flexible layer 110 that may be transformed by force and an electrode 120 embedded in the flexible layer 110. The electrode structure 100 may be used as an electrode of an electronic device, in particular, a flexible electronic device. For example, if the flexible layer 110 includes a material that is charged with electricity, the flexible layer 110 may be a constituent element of a triboelectric generator.

The flexible layer 110 may include a flexible material, such as a photocurable material, a thermal crosslinkable material, or a flexible polymer. For example, the flexible layer 110 a dielectric material, such as polytetrafluoroethylene(Teflon), polydimethylsiloxane(PDMS), fluorinated ethylene propylene (FEP), poly(methyl methacrylate) (PMMA), polyvinylidene fluoride(PVDF), polycarbonate (PC), polyvinyl chloride(PVC), polyimide (Kapton), polypropylene(PP), polyethylene(PE) 및 polystyrene(PS), polyformaldehyde, ethylcellulose, polyamide, melamine formol, perfluoroalkoxy alkane (PFA), wool, silk, mica, and nylon or an insulating material, or a photoresist, such as SU-8.

At least a part of the electrode 120 may be embedded in the flexible layer 110. For example, at least a part of the electrode 120 may be embedded from a surface of the flexible layer 110 into the flexible layer 110. Since at least a part of the electrode 120 is embedded in the flexible layer 110, the loss of the electrode 120 may be reduced or prevented in a bending or stretching process.

The electrode 120 according to the example embodiment may include a plurality of conductive structures 122. The conductive structures 122 may have a network structure in which neighboring conductive structures 122 are connected to each other. Hereinafter, the conductive structures 122 that constitute the network structure may be referred to as a conductive network. Since the electrode 120 has a conductive network, the electrode 120 may be flexible and stretchable. Also, the conductive network may have optical transmittance greater than a film type.

At least one of the conductive structures 122 may have the shape of at least one of a wire having a length greater than a width, a fiber, and a rod. Also, the conductive structures 122 may include a material having high electrical conductivity. For example, the conductive structures 122 may include at least one of graphene, indium tin oxide (ITO), a metal, and a conductive polymer. The metal may include, for example, at least one of Ag, Al, Cu, Au, Ni, Cr, and Pt, but the example embodiment is not limited thereto.

As described above, the electrode structure 100, in which the electrode 120 having a network structure is embedded in the flexible layer 110, has a high degree of flexibility, and the loss of the electrode 120 may be hindered or prevented, and thus, the electrode structure 100 may be applied to a flexible electronic device.

Figure 2A:
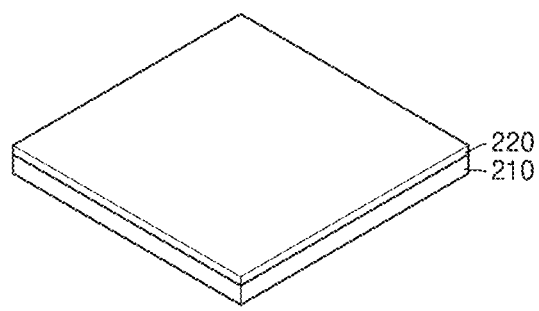
FIGS. 2A through 2E are perspective views describing a method of manufacturing an electrode structure according to an example embodiment.

FIGS. 2A through 2E are perspective views for explaining a method of manufacturing an electrode structure according to an example embodiment. First, as depicted in FIG. 2A, a first mother substrate 210 on which a hydrophobic film 220 is formed may be prepared. The first mother substrate 210 may include an arbitrary material. For example, the first mother substrate 210 may be a glass substrate. The hydrophobic film 220 may include a material having a lyophobicity characteristic. For example, the hydrophobic film 220 may include an organic material including a self assembled monolayer (SAM), such as octadecyltrichlorosilane (OTS) or n-octadecyltrichlorosilane or fluorine and having a low surface energy.

Figure 2B:
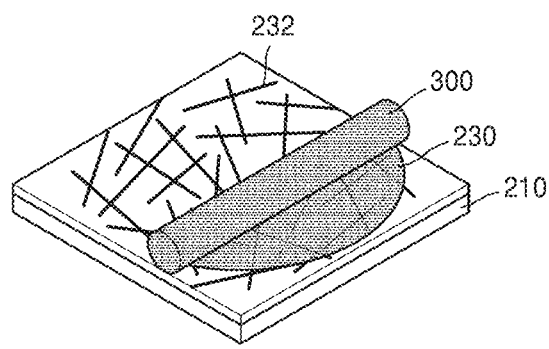

As depicted in FIG. 2B, a solution including the conductive structures 122 may be coated on the first mother substrate 210. The coating may be performed by using a Meyer rod 300. The coating with a Meyer rod 300 may have an advantage in that an areal factor of the conductive structures 122 to be deposited may be controlled. A space between metal coils within the Meyer rod 300 may determine an areal factor of the conductive structures 122. For example, the larger the space between the metal coils in the Meyer rod 300, the smaller the areal factor of the conductive structures 122 to be deposited. Of the coated conductive structures 122, neighboring conductive structures 122 may form a network by which the conductive structures 122 are connected to each other.

Figure 2C:
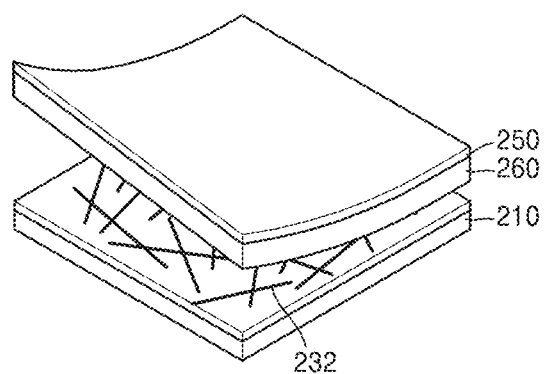

As depicted in FIG. 2C, a flexible material 260 may be laminated on the first mother substrate 210 with the coated solution therebetween. For example, after spin coating a thermocurable precursor, such as an UV-hardening SUB or polydimethylsiloxane (PDMS) on a second mother substrate 250, for example, a polyethylene terephthalate (PET) substrate, the flexible material 260 may be laminated on the first mother substrate 210 on which the solution including the conductive structures 122 is coated. The liquid state flexible material 260 may readily penetrate into small interstices of the conductive network.

Figure 2D:
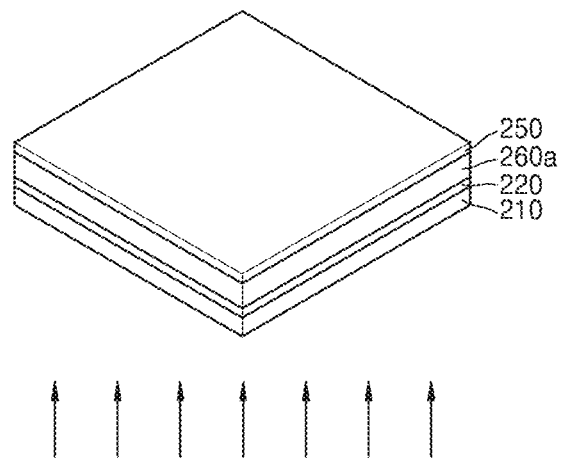
Figure 2E:
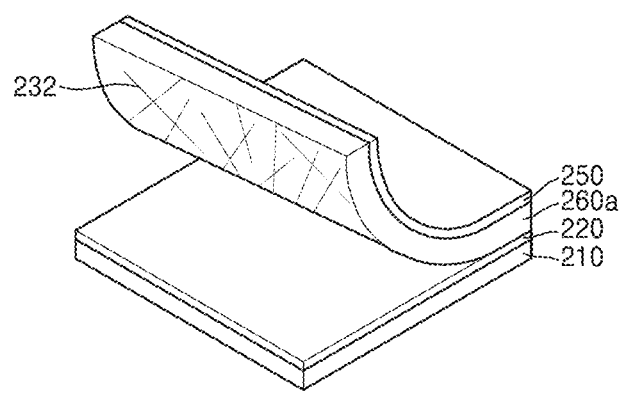

Afterwards, as depicted in FIG. 2D, crosslinking in the flexible material 260 may occur by optical irradiation or thermal treatment to the flexible material 260, and thus, the flexible material 260 and the conductive network may be interlocked. That is, the flexible material 260 may become a flexible layer 260a by hardening the flexible material 260. Finally, as depicted in FIG. 2E, the electrode structure 100 is spaced apart from the first mother substrate 210. Since the first mother substrate 210 is treated with the hydrophobic film 220, the bonding force between the electrode structure 100 and the first mother substrate 210 is weak, and thus, the electrode structure 100 may be safely exfoliated. Also, since the conductive network is embedded in the flexible layer 260a, the mechanical robustness of the conductive network is high, and thus, the exfoliation of the electrode structure 100 from the first mother substrate 210 is easy. Finally, the second mother substrate 250 may be spaced apart from the flexible layer 260a.

In the electrode structure 100 in which the conductive network is embedded, optical transmittance of the electrode structure 100 may be controlled according to an areal factor of the conductive network. Here, the areal factor may denote a ratio between an exposed surface area of the conductive network with respect to a surface area of the flexible layer 110.

Figure 3A:
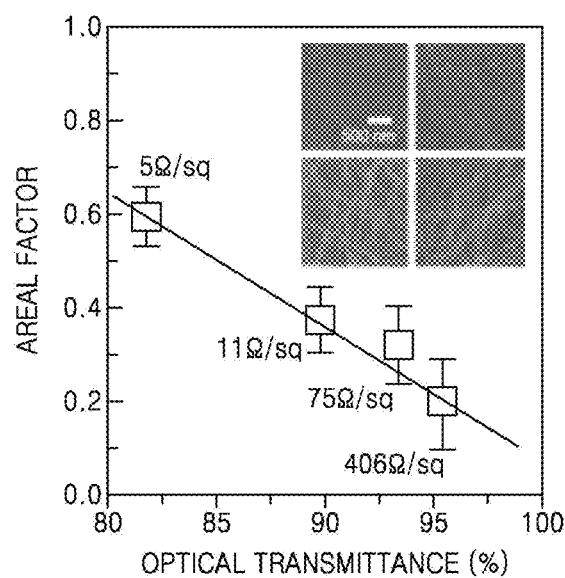
FIG. 3A is a graph showing a measurement result of optical transmittance according to an areal factor of a conductive network, according to an example embodiment.

FIG. 3A is a graph showing a measurement result of optical transmittance according to an areal factor of a conductive network, according to an example embodiment. Conductive structures of the conductive network are Ag nano wires (hereinafter, also referred to as an Ag network). The flexible layer may include SU8, which is a bisphenol epoxy that is dissolved in an organic solvent such as gamma-butyrolactone (GBL) or cyclopentanone, and up to about 10 wt % of mixed triarylsulfonium/hexafluoroantimonate salt as a photoacid generator. As depicted in FIG. 3A, it is seen that, as the areal factor of the conductive network decreases, the sheet resistance becomes larger. Also, it is seen that, as the areal factor of the conductive network decreases, the optical transmittance is increased. Thus, the sheet resistance and the optical transmittance may be controlled by controlling the areal factor of the conductive network. The electrode structure 100 according to the example embodiment may be used as an electrode of a transparent electronic device.

Figure 3B:
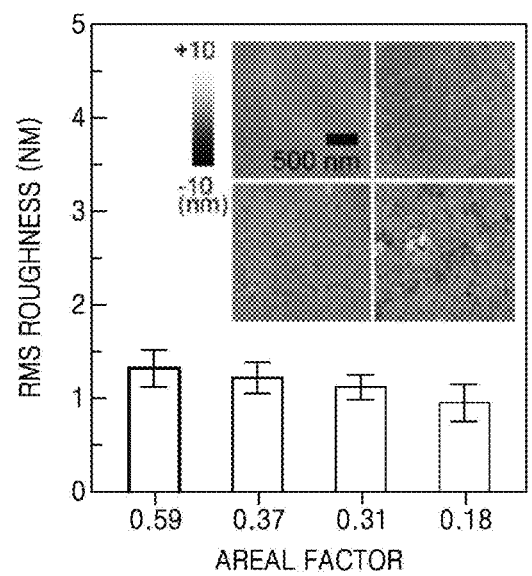
FIG. 3B is a graph showing a measurement of a root-mean-square roughness (RMS) according to an areal factor of a conductive network embedded in a flexible layer.

A surface roughness of the conductive network may not change greatly according to the change of the areal factor of the conductive network since the conductive network is embedded in a flexible layer. FIG. 3B is a graph showing a measurement of a root-mean-square roughness (RMS) according to an areal factor of a conductive network embedded in a flexible layer. As depicted in FIG. 3B, it is seen that although the areal factor of the conductive network is increased, the RMS value may not exceed about 2 nm. The surface morphology or the surface roughness may affect the performance of a triboelectric generator. The structure of the electrode 120 in which the conductive network described above is embedded may be used as a constituent element of a triboelectric generator.

The electrode structure 100, in which the conductive network described above is embedded, may have not only mechanical flexibility but also mechanical robustness greater than the flexibility and robustness of an electrode structure on which a conductive network is coated.

Figure 4A:
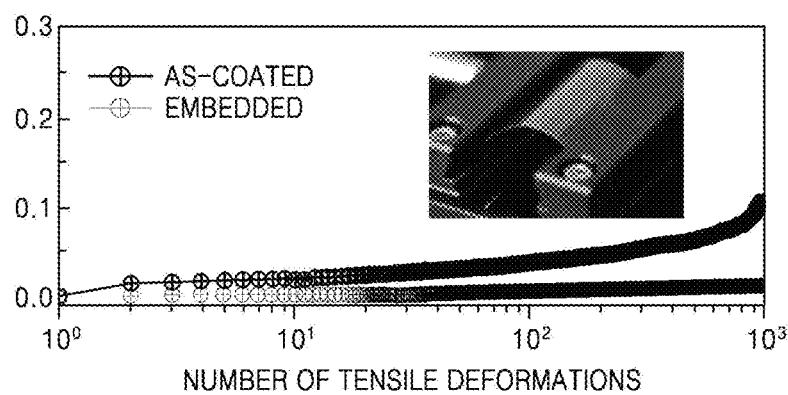
FIG. 4A is a graph showing measurement results of sheet resistances according to the number of tensile deformations of an electrode structure in which an SU8 layer is coated with an Ag network and an electrode structure in which an Ag network is embedded in an SU8 layer.

Next, measurement results of variations of sheet resistances of an embedded conductive network and coated conductive network will be described. FIG. 4A is a graph showing measurement results of variations of sheet resistances according to the number of tensile deformations of an electrode structure in which an SU8 layer is coated with an Ag network and an electrode structure in which an Ag network is embedded in an SU8 layer. In this example, the tensile deformation is about 3%. As depicted in FIG. 4A, although the number of tensile deformations is increased, the embedded Ag network maintains a substantially constant sheet resistance variation when compared to the coated Ag network.

Figure 4B:
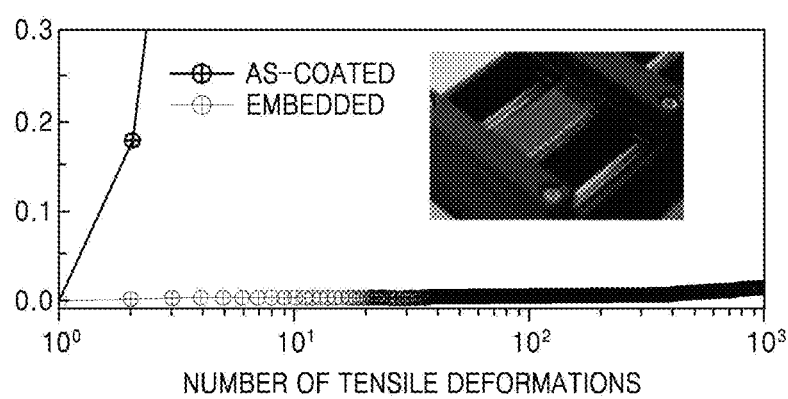
FIG. 4B is a graph showing measurement results of sheet resistances according to the number of stretching strains of an electrode structure in which a PDMS layer is coated with an Ag network and an electrode structure in which an Ag network is embedded in a PDMS layer.

FIG. 4B is a graph showing measurement results of variations of sheet resistances according to the number of stretching strains of an electrode structure in which a PDMS layer is coated with an Ag network and an electrode structure in which an Ag network is embedded in a PDMS layer. In this example, the stretching strain is about 15%. As depicted in FIG. 4B, although the number of stretching strains is increased, the embedded Ag network maintains a constant sheet resistance variation when compared to the coated Ag network.

Figure 4C:
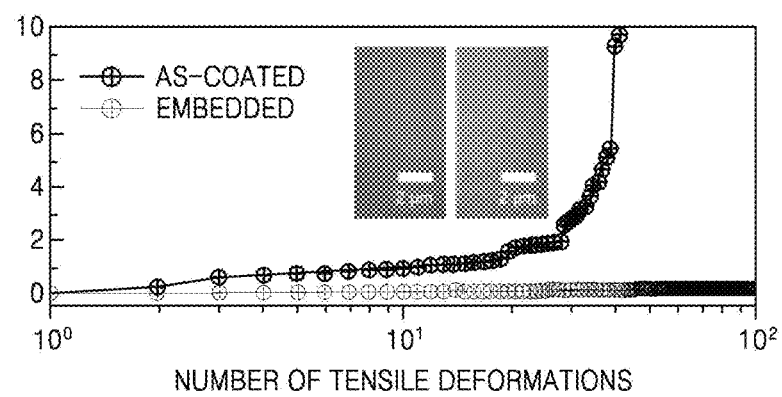
FIG. 4C is a graph showing measurement results of sheet resistances according to the number of attachments/detachments of an electrode structure in which a PDMS layer is coated with an Ag network and an electrode structure in which an Ag network is embedded in a PDMS layer.

FIG. 4C is a graph showing measurement results of variations of sheet resistances according to the number of attachments/detachments of an electrode structure in which a PDMS layer is coated with an Ag network and an electrode structure in which an Ag network is embedded in a PDMS layer. Here, the attachments/detachments were performed by attaching/detaching a 3M scotch tape to and from an exposed surface of the conductive network. As depicted in FIG. 4C, it is confirmed that although the number of attachments/detachments is increased, the embedded Ag network maintains a constant sheet resistance variation when compared to the coated Ag network.

As described above, the electrode structure in which a conductive network is embedded has high mechanical flexibility and mechanical robustness while having a surface roughness that is less than a specific or desired value, and thus, the electrode structure may be applied to various flexible electronic devices. For example, the electrode structure described above may be used as a constituent element of a triboelectric generator.

Figure 5:
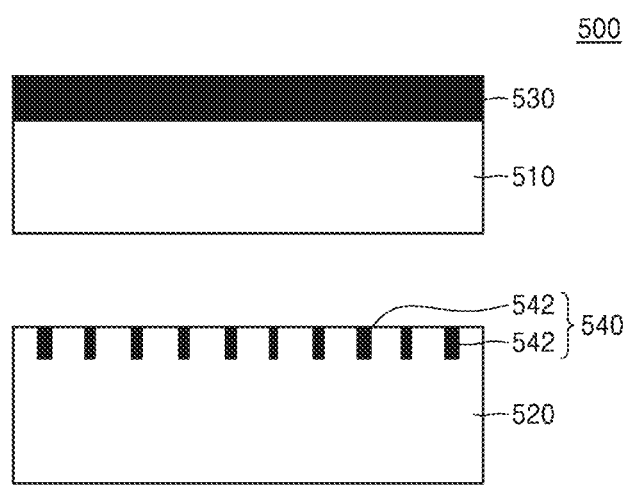
FIG. 5 is a schematic cross-sectional view of a triboelectric generator according to an example embodiment.

FIG. 5 is a schematic cross-sectional view of a triboelectric generator 500 according to an example embodiment. Referring to FIG. 5, the triboelectric generator 500 according to the example embodiment may include first and second charging layers 510 and 520 that may contact and separate from each other and are charged with opposite polarities to each other due to the contact between each other, a first electrode 530 on the first charging layer 510, and a second electrode 540 that is separate from the first electrode 530 and some portions thereof are embedded in the second charging layer 520.

In some example embodiments, the first and second charging layers 510 and 520 may contact or separate from each other due to the existence of an external force. For example, when a force is applied to at least one of the first and second charging layers 510 and 520, the first and second charging layers 510 and 520 may contact each other, and when the applied force is released, the first and second charging layers 510 and 520 may separate from each other. When the first and second charging layers 510 and 520 contact each other, the first and second charging layers 510 and 520 may be charged with opposite polarities to each other. For example, the first charging layer 510 may be charged with negative charges, and the second charging layer 520 may be charged with positive charges. The first and second charging layers 510 and 520 may correspond to the flexible layer 110 of FIG. 1. The first and second charging layers 510 and 520 may include a flexible material that may be charged with negative charges or positive charges due to the contact between each other.

The first charging layer 510 is charged with negative charges by contacting the second charging layer 520, and thus, may include a material having a relatively high electrical conductivity when compared to the second charging layer 520. For example, the first and second charging layers 510 and 520 may include a dielectric material, such as polytetrafluoroethylene(Teflon), polydimethylsiloxane (PDMS), fluorinated ethylene propylene(FEP), poly(methyl methacrylate)(PMMA), polyvinylidene fluoride(PVDF), polycarbonate(PC), polyvinyl chloride(PVC), polyimide (Kapton), polypropylene(PP), polyethylene(PE), polystyrene(PS), polyformaldehyde, ethylcellulose, polyamide, melamine formol, perfluoroalkoxy alkane(PFA), wool, silk, mica, or nylon, or an insulating material, or a photoresist, such as SU8.

The first and second charging layers 510 and 520 may be determined as a positive charging layer or a negative charging layer according to the electrical conductivity of the first and second charging layers 510 and 520. For example, when the first charging layer 510 includes PFA and the second charging layer 520 includes PDMS, the first charging layer 510 may be or include a negative charge layer and the second charging layer 520 may be or include a positive charge layer. When the first charging layer 510 includes nylon and the second charging layer 520 includes PDMS, the first charging layer 510 may be or include a positive charge layer and the second charging layer 520 may be or include a negative charge layer. The first and second charging layers 510 and 520 may include a combination of various materials besides the materials described above.

At least one of the first and second charging layers 510 and 520 may be doped with a p-type dopant or an n-type dopant to control a charge characteristic of a surface thereof. A source of p-type dopant may be, for example, an ionic liquid, such as $NO_2BF_4$, $NOBF_4$, or $NO_2SbF_6$, an acidic compound, such as HCl, $H_2PO_4$, $CH_3COOH$, $H_2SO_4$, $HNO_3$, and an organic compound, such as dichlorodicyanoquinone (DDQ), oxone, dimyristoylphosphatidylinositol (DMPI), or trifluoromethanesulfoneimide, etc. Also, a source of p-type dopant may include, for example, $HPtCl_4$, $AuCl_3$, $HAuCl_4$, silver trifluoromethanesulfonate (AgOTf), $AgNO_3$, $H_2PdCl_6$, $Pd(OAc)_2$, or $Cu(CN)_2$, etc.

A source of an n-type dopant may be, for example, a reduction product of a substituted or unsubstituted nicotinamide), a reduction product of a compound which is chemically bound to a substituted or unsubstituted nicotinamide), and a compound comprising at least two pyridinium moieties in which a nitrogen atom of at least one of the pyridinium moieties is reduced. For example, an n-type dopant source may include nicotinamide mononucleotide-H (NMNH), nicotinamide adenine dinucleotide-H (NADH), nicotinamide adenine dinucleotide phosphate-H (NADPH) or viologen. The n-type dopant source may include a polymer, such as polyethylenimine (PEI). Also, the n-type dopant source may include an alkali metal, such as K or Li. The p-type dopant source and the n-type dopant source described above are examples, and thus, various dopant materials may be used as the dopant of the example embodiment.

The first electrode 530 may be disposed on the first charging layer 510. For example, the first electrode 530 may be disposed on an upper surface of the first charging layer 510. The first electrode 530 may include a material having high electrical conductivity. For example, the first electrode 530 may include at least one of graphene, ITO, a metal, and a polymer. The metal may be at least one of Ag, Al, Cu, Au, Ni, Cr, and Pt, but is not limited thereto. The first electrode 530 may have a monolayer or a multilayer structure.

The second electrode 540 may be disposed between the first and second charging layers 510 and 520, and at least a portion of the second electrode 540 may be embedded in the second charging layer 520. For example, the second electrode 540 may correspond to the electrode 120 of FIG. 1. For example, at least some regions of the second electrode 540 may be embedded from a surface of the second charging layer 520 into the second charging layer 520. Here, the second electrode 540 may be embedded in an upper surface of the second charging layer 520, and the upper surface of the second charging layer 520 may contact, or separate from, a lower surface of the first charging layer 510.

Also, the remaining region of the second electrode 540 may be exposed to the outside from the surface of the second charging layer 520. A surface roughness of the second electrode 540 may be a substantially constant value or less. For example, the second electrode 540 may have an RMS of about 2 nm or less, and an areal factor of the second electrode 540 with respect to the second charging layer 520 may be in a range from about 10% to about 80%.

Also, since some regions of the second electrode 540 are embedded in the second charging layer 520, although the second charging layer 520 generates a friction with the first charging layer 510, the loss of the second electrode 540 may be reduced or prevented, thereby increasing a mechanical strength of the second electrode 540.

The second electrode 540 according to the example embodiment may include a plurality of conductive structures 542. The conductive structures 542 may be a network (hereinafter, also referred to as a conductive network) in which neighboring conductive structures 542 are connected to each other. Since the second electrode 540 has a conductive network structure, the second electrode 540 is flexible and stretchable.

The conductive structures 542 may have a rod, a wire, or a fiber shape in which a length thereof is longer than a width thereof. For example, the conductive structures 542 may have a width in the nanometer range, and a length in the micron range. The conductive structures 542 may include a material having high electrical conductivity. For example, the conductive structures 542 may include at least one of graphene, carbon nanotube (CNT), ITO, a metal, and a conductive polymer. Here, the metal may include at least one of Ag, Al, Cu, Au, Ni, Cr, and Pt, but is not limited thereto.

Hereinafter, an operation mechanism of a triboelectric generator will be described. The triboelectric generator may transform a mechanical energy to electrical energy based on a coupling between triboelectrification and electrostatic induction.

FIGS. 6A through 6D are drawings for explaining an operation mechanism of a triboelectric generator 500, according to an example embodiment.

Figure 6A:
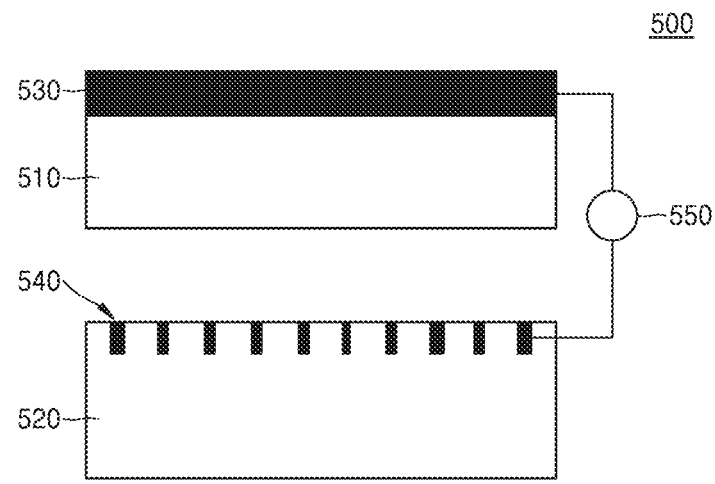
FIGS. 6A through 6D are drawings describing an operation mechanism of a triboelectric generator according to an example embodiment.

FIG. 6A shows an initial state of the triboelectric generator 500. In an initial state in which an external force is not applied to the triboelectric generator 500, the first and second charging layers 510 and 520 are separately disposed from each other. Reference numeral 550 is a load for detecting a charge flow between the first electrode 530 and the second electrode 540.

Figure 6B:
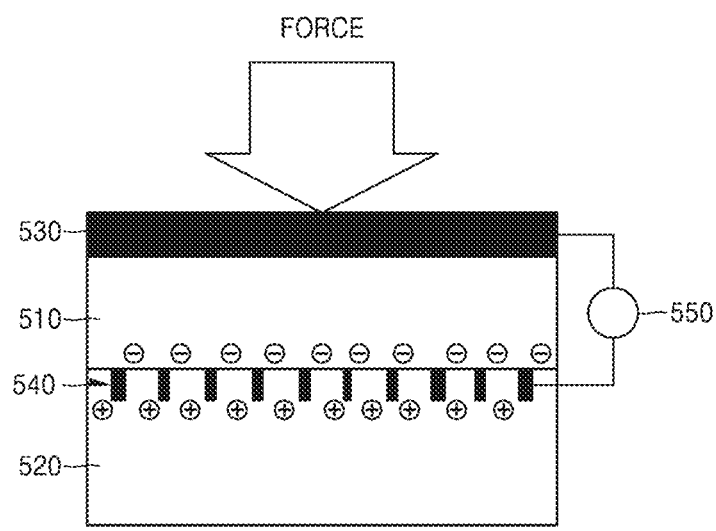

When a force is applied to at least one of the first and second charging layers 510 and 520, as depicted in FIG. 6B, the first and second charging layers 510 and 520 contact each other. The first charging layer 510 and the second charging layer 520, respectively, may include materials that are charged with opposite charges. For example, the first and second charging layers 510 and 520 may be a negative charge layer and a positive charge layer, respectively. Therefore, when the first and second charging layers 510 and 520 contact each other, a contact surface of the first charging layer 510 may be charged with negative charges, and a contact surface of the second charging layer 520 may be charged with positive charges.

Figure 6C:
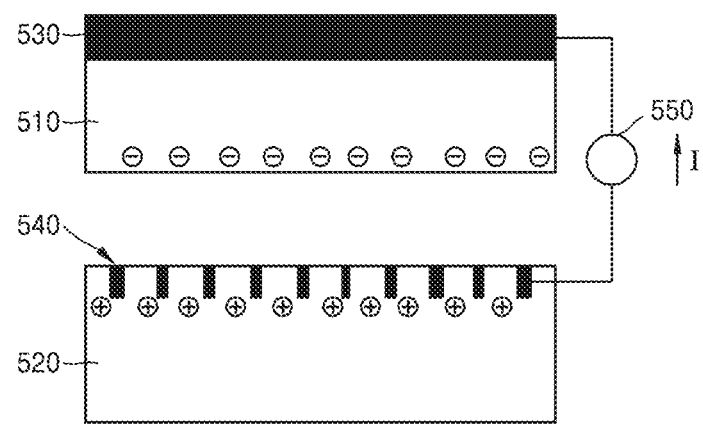

Afterwards, when the force applied to at least one of the first and second charging layers 510 and 520 is released, as depicted in FIG. 6C, the first and second charging layers 510 and 520 are spaced apart from each other to be restored to the original positions. Since the first charging layer 510 is charged with negative charges and the second charging layer 520 is charged with positive charges, an electrostatic induction phenomenon occurs in the first and second charging layers 510 and 520 in order to achieve a charge balance of the first and second charging layers 510 and 520, and thus, electrons in the first electrode 530 move to the second electrode 540. Thus, a current "I" flows in the load 550.

Figure 6D:
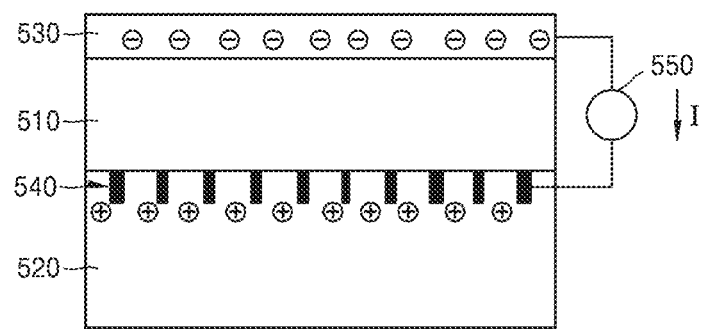

Also, as depicted in FIG. 6D, when a force is applied to at least one of the first and second charging layers 510 and 520, the first and second charging layers 510 and 520 may contact each other, and electrons in the second electrode 540 may move to the first electrode 530 due to an electrostatic induction phenomenon, and thus, a current "I" may flow in the load 550. If the force is repeatedly applied to at least one of the first and second charging layers 510 and 520, the triboelectric generator 500 may repeatedly perform the operations described above with reference to FIGS. 6C and 6D.

Electrical energy generated from the triboelectric generator 500 may vary depending on the respective materials of the first and second charging layers 510 and 520, and may also vary depending on an areal factor of the second electrode 540.

Figure 7:
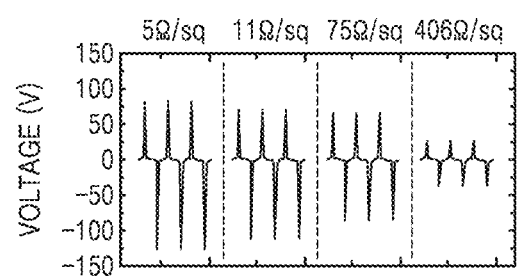
FIG. 7 is a graph illustrating measurement results of voltages outputted from a triboelectric generator according to an areal factor of a second electrode according to an example embodiment.

FIG. 7 is a graph showing measurement results of voltages outputted from the triboelectric generator 500 according to an areal factor of the second electrode 540 according to an example embodiment. For this measurement, Al is used as the first electrode 530, PFA is used as the first charging layer 510, PDMS is used as the second charging layer 520, and Ag network is used as the second electrode 540. The Ag network is embedded in the second charging layer 520 so that the sheet resistance of the second electrode 540 is about 5 Ω/sq, 11 Ω/sq, about 75 Ω/sq, and about 406 Ω/sq, respectively. As depicted in FIG. 7, it may be confirmed that an output voltage varies according to the sheet resistance of the second electrode 540. That is, it may be confirmed that electrical energy generated from the triboelectric generator 500 may be controlled by controlling the areal factor of the embedding second electrode 540.

Figure 8:
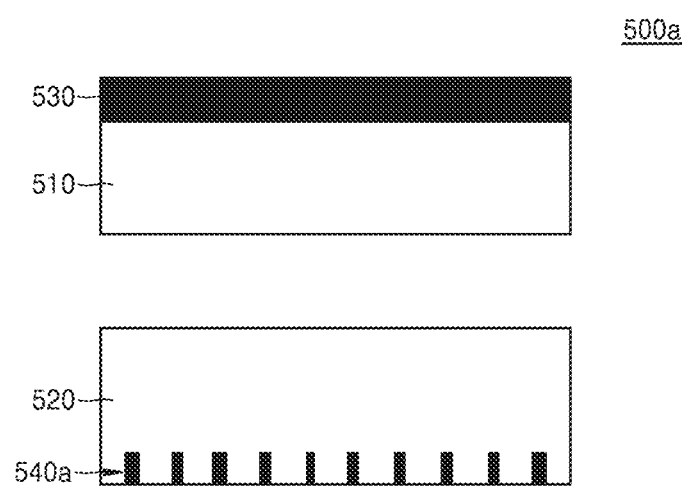
FIG. 8 is a schematic cross-sectional view of a triboelectric generator according to another example embodiment.

FIG. 8 is a schematic cross-sectional view of a triboelectric generator 500a according to another example embodiment. When FIG. 8 is compared to FIG. 5, a second electrode 540a may be disposed on a lower surface of the second charging layer 520. That is, the first and second charging layers 510 and 520 may be disposed between the first electrode 530 and the second electrode 540a. When the second electrode 540a is disposed on the lower surface of the second charging layer 520 as described above, electrical energy generated from the triboelectric generator 500a may be less affected by the areal factor of the second electrode 540a.

Figure 9:
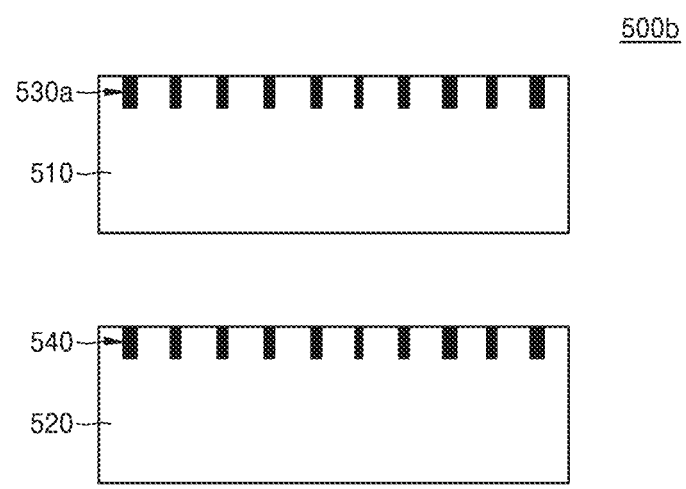
FIG. 9 is a schematic cross-sectional view of a triboelectric generator according to another example embodiment.

FIG. 9 is a graph showing measurement results of voltages outputted from a triboelectric generator 500b according to an areal factor of a second electrode 540a of FIG. 8. For this measurement, Al is used as the first electrode 530, PFA is used as the first charging layer 510, SU-8 is used as the second charging layer 520, and an Ag network is used as the second electrode 540a. For example, the Ag network is embedded in the second charging layer 520 so that the sheet resistance of the second electrode 540a is about 5 Ω/sq, about 11 Ω/sq, about 75 Ω/sq, and about 406 Ω/sq, respectively. As depicted in FIG. 9, it may be confirmed that although the sheet resistance of the second electrode 540a is changed, output voltages are almost constant.

Figure 10:
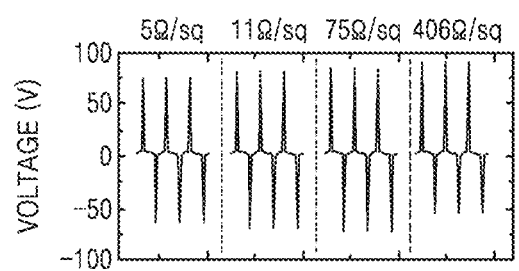
FIG. 10 is a graph illustrating measurement results of voltages outputted from a triboelectric generator according to an areal factor of a second electrode of FIG. 8.

FIG. 10 is a schematic cross-sectional view of a triboelectric generator 500c according to another example embodiment. When FIG. 10 is compared to FIG. 5, a first electrode 530a may have a conductive network structures. At least some regions of the first electrode 530a are embedded in the first charging layer 510. For example, the at least some regions of the first electrode 530a may be embedded into the first charging layer 510 from a surface of the flexible layer 110.

Figure 11:
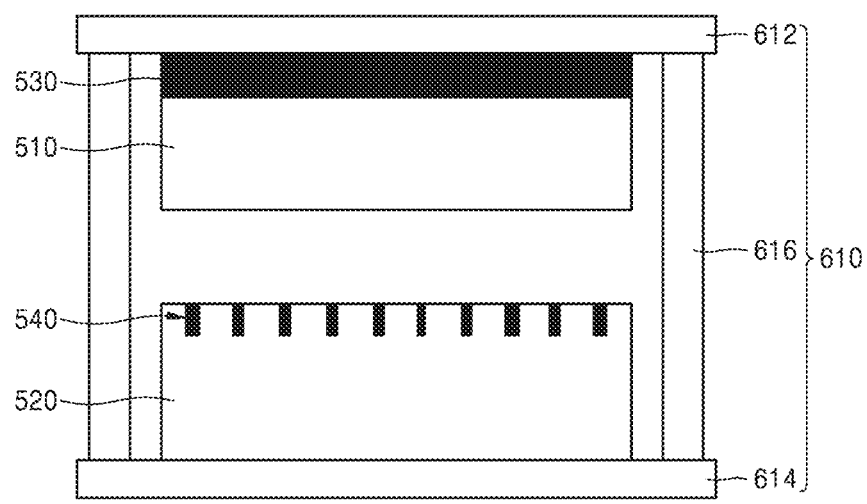
FIG. 11 is a schematic cross-sectional view of a triboelectric generator according to another example embodiment.

FIG. 11 is a schematic cross-sectional view of a triboelectric generator 500d according to another example embodiment. When FIG. 11 and FIG. 5 are compared, the triboelectric generator 500d may include a supporting member 610 that supports the first and second charging layers 510 and 520. The supporting member 610 may include a first substrate 612 that contacts the first electrode 530 and supports the first charging layer 510, a second substrate 614 that contacts the second charging layer 520 and supports the second charging layer 520, and an elastic member 616 that connects the first substrate 612 to the second substrate 614.

The first substrate 612 and the second substrate 614 may be spaced apart from each other with a constant distance therebetween. For example, the first substrate 612 may be an upper substrate and the second substrate 614 may be a lower substrate. The first and second substrates 612 and 614 may have a flat structure, but are not limited thereto. The first and second substrates 612 and 614 may include a hard material, for example, silicon wafer or glass. However, the first and second substrates 612 and 614 are not limited thereto, and may include various materials besides the hard material.

The elastic member 616 may be disposed between the first and second substrates 612 and 614 so that the first and second charging layers 510 and 520 are separately disposed. The elastic member 616 may include a spring. However, the elastic member 616 according to the example embodiment is not limited thereto, that is, the elastic member 616 may include various elastic materials. Accordingly, when the first substrate 612 is pressed, the first substrate 612 moves downwards, and thus, the first and second charging layers 510 and 520 contact each other. When the applied force is released, the first substrate 612 moves upwards by a restoration force of the elastic member 616, and thus, the first and second charging layers 510 and 520 are spaced apart from each other.

According to at least one example embodiment, an electrode structure is embedded in a flexible layer, and thus, the mechanical robustness of the electrode structure may be increased.

While this inventive concepts has been particularly shown and described with reference to embodiments thereof, it will be understood by those of ordinary skill in the art that various changes in form and details may be made therein without departing from the spirit and scope of the inventive concepts as defined by the appended claims. The embodiments should be considered in descriptive sense only and not for purposes of limitation. Therefore, the scope of the inventive concepts is defined not by the detailed description of the inventive concepts but by the appended claims, and all differences within the scope will be construed as being included in the inventive concepts.

What is claimed is:

1. A triboelectric generator comprising:
a first charging layer and a second charging layer, the first and second charging layers being configured to be in contact with, or to be spaced apart from each other, the first and second charging layers being configured to be charged with opposite polarities when in contact with each other;
a first electrode on the first charging layer; and
a second electrode spaced apart from the first electrode, at least some regions of the second electrode being embedded in the second charging layer,
wherein the second electrode is embedded in a surface of the second charging layer opposite to the surface of the second charging layer contacting the first charging layer, and electrical energy generated from the triboelectric generator depends on areal factor of the second electrode.

2. The triboelectric generator of claim 1, wherein the at least some regions of the second electrode are embedded from a surface of the second charging layer to an inner portion thereof.

3. The triboelectric generator of claim 2, wherein remaining regions of the second electrode are exposed to the outside from the surface of the second charging layer.

4. The triboelectric generator of claim 2, wherein an areal factor of the triboelectric generator is in a range from about 10% to about 80%.

5. The triboelectric generator of claim 1, wherein a root-mean-square (RMS) roughness of a surface of the second charging layer embedded in the second electrode is about 2 nm or less.

6. The triboelectric generator of claim 1, wherein the second electrode comprises a network in which neighboring conductive structures from among a plurality of conductive structures are connected to one another.

7. The triboelectric generator of claim 6, wherein at least one of the plurality of conductive structures has a shape of at least one of a wire, a rod, or a fiber having a length that is greater than a width thereof.

8. The triboelectric generator of claim 6, wherein at least one of the plurality of conductive structures comprises at least one of a metal or graphene.

9. The triboelectric generator of claim 1, wherein one of the first and second charging layers is charged with negative charges, and the other is charged with positive charges.

10. The triboelectric generator of claim 1, further comprising a supporting member configured to support the first and second charging layers,
wherein the first and second charging layers are spaced apart from one another when a force is not applied to the first and second charging layers.

11. The triboelectric generator of claim 10, wherein the supporting member comprises an elastic material.

* * * * *